United States Patent Office 2,874,202
Patented Feb. 17, 1959

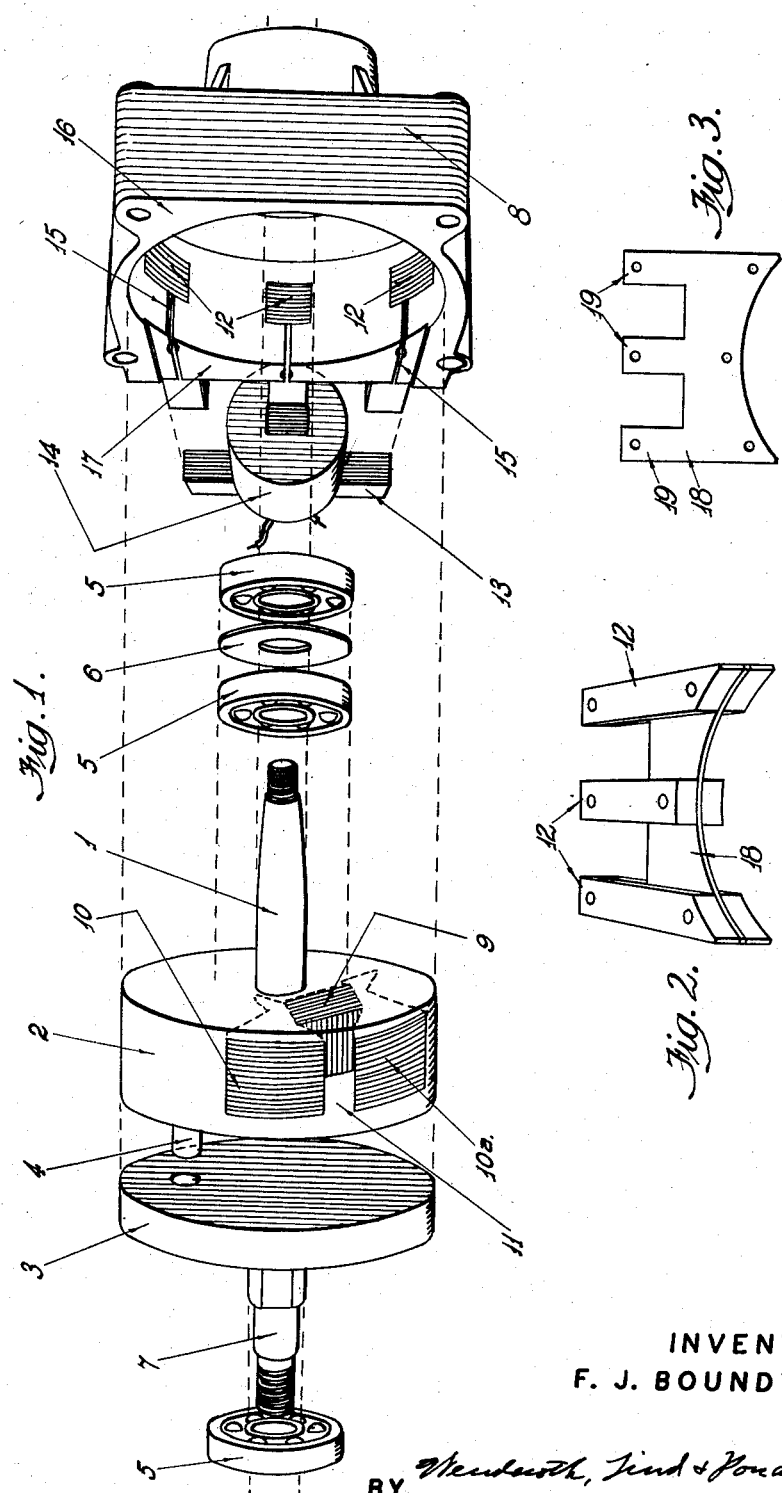

2,874,202
ELECTRIC IGNITION MAGNETO
Francis John Boundy, Belgrave, Victoria, Australia
Application November 15, 1956, Serial No. 622,327
Claims priority, application Australia November 25, 1955
9 Claims. (Cl. 123—149)

This invention relates to electrical ignition means or apparatus for internal combustion engines and refers more particularly to high tension polar inductor magnetos of the type generally known as flywheel magnetos.

In a high tension magneto of the type referred to, it is established practice to incorporate in the flywheel of an internal combustion engine an appropriate permanent magnet and laminated pole pieces or inductors to produce a rotary magnetic field which produces cyclic flux changes in a fixed permeable laminated structure or stator carrying an armature having primary and secondary windings, the circuit of the primary winding being interrupted when the current generated therein is at a maximum by a contact breaker or interrupter actuated by a cam on the crankshaft or other rotary element of the engine.

Hitherto, high tension flywheel type magnetos have been embodied in and associated with a flywheel external to the crank case of an engine, but such an arrangement has a disadvantage especially when compactness is required, in that the size or bulk of the engine is apt to be considerably increased, and, moreover, the supporting of the laminated structure carrying the armature involved complexity and increased the cost of the engine.

Now the principal objective of this invention is to provide in an internal combustion engine a simple and highly efficient high tension polar inductor magneto in which the above-mentioned disadvantages are obviated, and which can be applied to two cycle or four cycle engines and produced at relatively small cost.

In achieving the above stated principal objective and according to the broadest concept of the invention there is provided a high tension polar inductor magneto which is embodied in an internal combustion engine and comprises a laminated structure mounted in the wall of the crank case and having fixed pole pieces at the inner side of the wall and outward extensions projecting from the wall, a rotary magnetic field within the crank case for producing flux changes in the laminated structure, means in the wall of the crank case preventing generation of eddy currents therein, an armature carried by the outward extensions of the laminated structure and having primary and secondary windings thereon, and an interrupter and condenser disposed in the primary circuit.

In a more specific construction, the rotary magnetic field is produced by a permanent magnet mounted for rotation within an engine crank case and having laminated pole pieces which in moving past the fixed pole pieces of a laminated structure mounted in the wall of the crank case produce flux changes in the fixed pole pieces with resultant generation of current in the primary winding of an armature the core of which comprises a part of the laminated structure.

In this more specific construction, the generation of eddy currents having magnetic fields opposing the flux changes in the laminated structure is prevented by the provision of open spaces or gaps formed in the wall of the crank case and disposed in the path through which eddy currents if generated would flow. In order to prevent escape of lubricant and loss of compression in the crank case in a two cycle engine, the open spaces or gaps are filled with a suitable insulating material.

The invention will be better understood from the following description of one practical arrangement of a high tension polar inductor magneto as disposed in the crank case of a two cycle internal combustion engine, when read in conjunction with the accompanying drawings wherein:

Figure 1 depicts in "exploded" projection the practical arrangement of a composite polar inductor magneto and engine crankshaft assembly in accordance with the present invention;

Figure 2 illustrates in perspective an alternative method for the prevention of generation of eddy currents; and Figure 3 shows in detail a plan view of the dielectric insert for use in preventing eddy currents according to the method illustrated in Figure 2.

Referring now to Figure 1 of the accompanying drawings the crankshaft 1 is provided with two axial aligned discal webs 2 and 3 spaced at the requisite distance apart to accommodate a connecting rod (not shown) journalled upon the crank pin 4.

Suitable ball races 5 and a thrust washer 6 provide the bearings to permit free rotation of the crankshaft assembly within a divided crank case or housing 8 one half only of which has been shown.

Extending axially from the discal crank web 2 is the main or driving shaft of the engine, and extending axially from the other discal crank web 3 and disposed in axial alignment with the main shaft is a shaft having an integrally formed cam 7 which operates an interrupter or circuit breaker disposed in the primary circuit of the magneto.

Preferably the crank pin 4, the main shaft 1 and the cam shaft are cast integrally with the discal crank webs 2 and 3 so that the whole assembly comprises a rigid one piece unit which forms the crankshaft of the engine.

Secured in the discal crank web 2 adjacent the main or driving shaft 1 is a suitable permanent magnet 9, and cast into the said crank web in contact with opposite poles of the magnet and in required positions relatively to the crank pin and the interrupter cam, is a pair of laminated pole pieces 10 and 10a which extend to and are machined flush with the peripheral face of the supporting crank web 2.

At the peripheral face of the crank web 2 the laminated pole pieces are separated by a space 11 constituted by portion of the peripheral face of the crank web, the pole pieces extending on opposite sides of the said space for required arcuate distances along the peripheral face of the crank web.

The abovementioned discal crank web 2 incorporating the rotary pole pieces 10 and 10a and magnet 9, or the entire crankshaft assembly where an integral unit is preferred, is constructed of non-ferrous metal.

The engine crank case is constructed in two sections which are bolted together. The upper section of the crank case (not shown) has the engine cylinder attached thereto, and the magneto is incorporated in the lower section 8.

The engine crank case is bored to freely admit the discal crank webs 2 and 3, an appropriate clearance being provided between the internal periphery of the former and the external periphery of the latter.

The crank case is composed of a non-ferrous metal such as aluminum, and cast in the wall of the lower section 8 thereof in required spaced positions are the three separate limbs of a permeable laminated structure 12.

The separate limbs 12 project outwardly from the lower section 8 of the crank case and extend inwardly to and flush with the inner bored peripheral face of the crank case 8. The limbs 12 are arranged to provide a central fixed pole piece and a pair of fixed pole pieces spaced from and at equal distances on opposite sides of the said central pole piece.

At their outer ends, the three limbs of the laminated structure 12 are coplanar and detachably connected at their outer ends is a transverse laminated bridging member 13 which together with the three limbs 12 provides a laminated structure of E-shaped construction.

An armature winding 14 having primary and secondary windings is accessibly mounted outside the crank case 8 upon the central limb of the E-shaped laminated structure 12 constituting the armature core.

The armature windings 14 may be readily removed and replaced or renewed upon removal of the transverse laminated member 10, as and when required.

A conventional contact breaker operable by the cam 7, above described, and an appropriate condenser are connected in the primary circuit of the armature 14. The contact breaker and the condenser may be mounted upon or associated with the armature 14.

In operation, and as the rotary pole pieces 10 and 10a move past the fixed poles 12 of the laminated E-shaped structure, a magnetic flux is firstly established in one direction in the central limb or core of the armature and the associated fixed pole pieces 12. Upon further movement of the rotary pole pieces 10 and 10a the direction of the magnetic flux in the armature core is reversed. At the instant of reversal a peak voltage is generated in the primary winding which upon interruption of the primary circuit produces the ignition voltage in the secondary winding.

It is important to prevent the generation of eddy currents in the portions of the crank case 8 disposed about the limbs 12 of the laminated E-shaped structure, as such currents set up magnetic fields opposing the field or flux producing them, and resultantly reduce the flux linked with the armature core with correspondingly marked reduction of peak primary voltage.

In order to prevent the generation of eddy currents, the portion of the wall of the crank case 8 surrounding each limb 12 of the laminated structure may be provided with a slot 15 which extends outwardly from the limb and completely through the crank case wall, thus forming an open space or gap across the path along which eddy currents would flow.

The escape of lubricating oil and loss of crank case compression in a two-cycle engine may be prevented by filling the slots or gaps 15 with a suitable insulating material, such as a phenolic resin. Moreover, the joint face 16 of the portion or half of the crank case 8 in which the laminated structure 12 is cast, may be provided with a recess 17 to be filled with a jointing material having a high electrical resistance, to thereby prevent eddy currents from passing through the abutting portions or halves of the crank case.

Alternately, the generation of eddy currents may conveniently be prevented by inserting between approximately the central laminae of each fixed pole piece 12, a thin sheet of material 18 of high dielectric strength such as asbestos to complete a fixed pole piece assembly as shown in Figures 2 and 3.

The completed fixed pole piece assembly is subsequently cast within the crank case wall the asbestos insertion preventing the escape of lubricating oil and in the case of two cycle engines the loss of compression within the crank case.

The asbestos insert is conveniently of the forms shown in Figure 3 having three complementary spaced extensions 19 to ensure insulation between the whole of the surface area of the laminations of each of the fixed pole pieces 12, between which the asbestos sheet 18 is inserted.

I claim:

1. In combination in an internal combustion engine, a crankcase and a crankshaft journalled in said case, a high tension polar inductor magneto comprising a permanent magnet integral with the crankshaft, a plurality of associated laminated pole pieces cast integral with the crankshaft and contacting the poles of said magnet for rotation within the crankcase and for generating together with said magnets a rotary magnetic field, a laminated structure cast integral with the wall of the crankcase and including a plurality of fixed pole pieces past which the laminated pole pieces move for effecting a change in flux in the fixed pole pieces, an armature carried by the laminated structure and having a primary winding in which armature current is generated responsive to the change of flux, and means in said crankcase for preventing the generation of eddy currents about said fixed pole pieces, said crankshaft and crankcase being composed of non-magnetic materials.

2. A combination according to claim 1 wherein the laminated structure cast integral with the crankcase has outward extensions projecting from the crankcase which extensions carry the armature.

3. A combination according to claim 2 and a detachable transverse laminated member connecting the outer projections of the laminated structure including the fixed pole pieces so as to permit convenient removal and replacement of an armature winding thereon.

4. A combination according to claim 1, and an interrupter and a condenser in the primary circuit of the armature.

5. A combination according to claim 1 wherein said crankcase has at least one slot disposed adjacent each fixed pole piece and extending from the latter throughout the thickness of the wall to a joining face of the crankcase and has a recess provided in the joining face communicating with each of the slots, said slot and recess comprising the means for preventing generation of eddy currents.

6. A combination according to claim 5 wherein said slots and recess are filled with insulating material.

7. A combination according to claim 1, wherein the means for preventing generation of eddy currents comprises a sheet or sheets of material of high dielectric strength disposed in the wall of the crankcase between the fixed pole pieces.

8. A combination according to claim 1 wherein the means for preventing generation of eddy currents comprises a sheet or sheets of material of high dielectric strength extending between the fixed pole pieces and disposed between at least two laminations of each of the fixed pole pieces.

9. A combination according to claim 1 in which there are two of said laminated pole pieces and a discal web cast on the crankshaft assembly with the outer ends formed by said laminated pole pieces flush with the outer peripheral face of said web, and said permanent magnet is between said laminated pole pieces.

References Cited in the file of this patent
UNITED STATES PATENTS

| | | |
|---|---|---|
| 2,453,636 | McKay | Nov. 9, 1948 |
| 2,605,753 | Madle | Aug. 5, 1952 |
| 2,643,274 | Miller | June 23, 1953 |